July 4, 1944.  A. L. PARKER  2,352,912

TUBE EXPANDING AND FLARING MACHINE

Filed March 31, 1941  3 Sheets-Sheet 1

Inventor
Arthur L. Parker
By
Mason & Porter
Attorneys

July 4, 1944. A. L. PARKER 2,352,912
TUBE EXPANDING AND FLARING MACHINE
Filed March 31, 1941 3 Sheets-Sheet 2
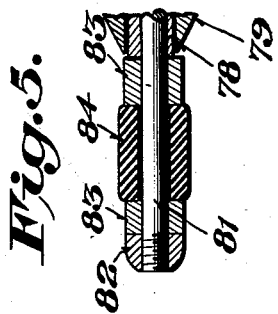
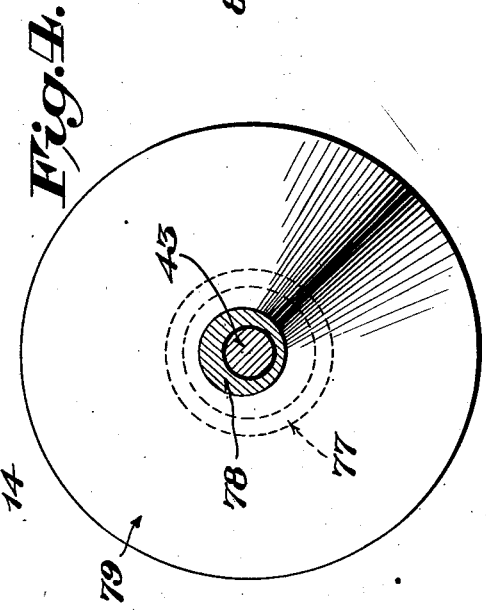
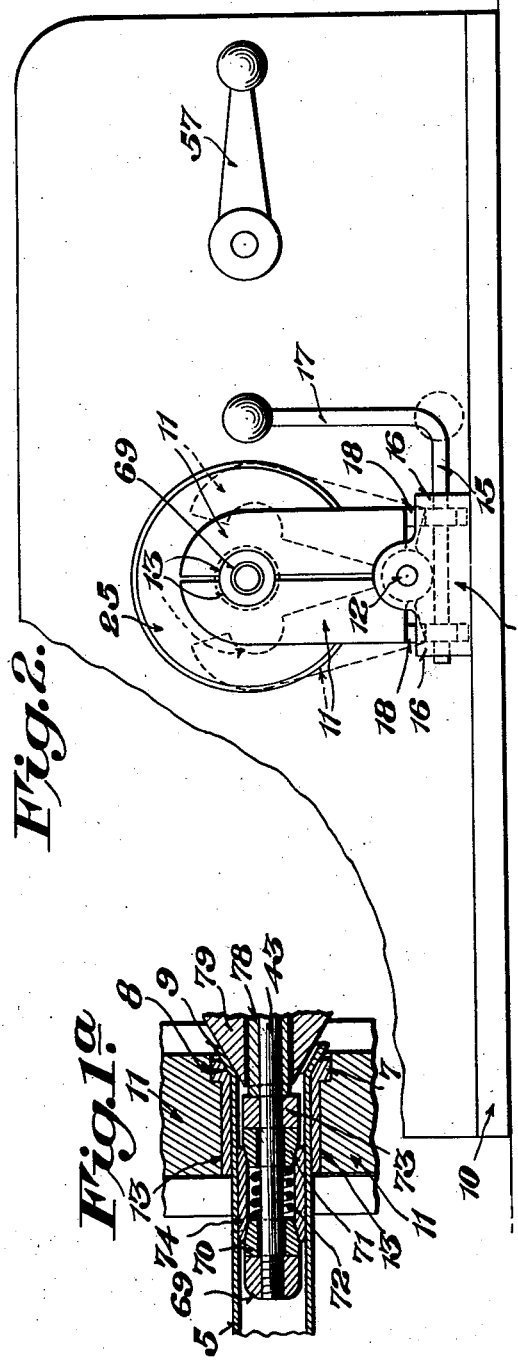
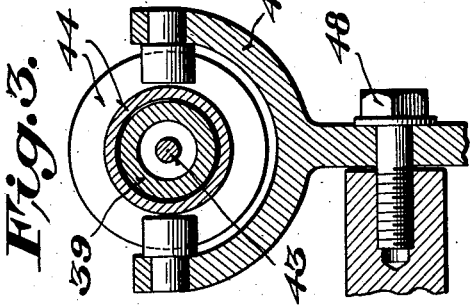
Inventor
Arthur L. Parker
By
Mason & Porter
Attorneys July 4, 1944.  A. L. PARKER  2,352,912
TUBE EXPANDING AND FLARING MACHINE
Filed March 31, 1941  3 Sheets-Sheet 3

Inventor
Arthur L. Parker
By Mason & Porter
Attorneys

Patented July 4, 1944

2,352,912

UNITED STATES PATENT OFFICE 2,352,912

TUBE EXPANDING AND FLARING MACHINE

Arthur L. Parker, Cleveland, Ohio, assignor to The Parker Appliance Company, Cleveland, Ohio, a corporation of Ohio Application March 31, 1941, Serial No. 386,207

13 Claims. (Cl. 153—79)

The invention relates generally to the art of assembling tubes in protective sleeves so as to form integrated coupling assembly units capable of resisting tube vibrations without breakage, and it primarily seeks to provide a novel, power driven machine structure capable of first expanding a tube into intimate wall to wall contact with a protective sleeve having an enlarged abutment head forming end portion including an end flare, and then flaring the tube into intimate wall to wall contact with said end flare. Assembly units of this character are disclosed in the copending application for U. S. Letters Patent, filed by Arthur L. Parker, on March 31, 1941, Serial No. 386,201.

In its more detailed nature the invention resides in providing a novel machine structure for assembling coupling units of the character stated and including a tube expanding chuck insertible into the tube and sleeve to be assembled, clamp means for holding the sleeve and tube with the chuck therein, fluid pressure actuated means for expanding and then releasing said chuck, and power actuated means for flaring the tube while it is being held by the clamp means.

Another object of the invention is to provide a machine of the character stated in which the flaring means comprises a power rotated coniform head which is reciprocable into and out of the end of the tube to be flared.

Another object of the invention is to provide a machine of the character stated in which the axis of the coniform head is disposed eccentrically with respect to the axis of the tube being flared.

Another object of the invention is to provide a machine of the character stated in which a single, manually operated valve controlled, fluid pressure actuated means serves to expand the chuck and also to move the coniform head longitudinally with respect to the tube.

Another object of the invention is to provide a machine of the character stated in which the tube and sleeve clamp comprises a pair of outside engaging jaws which open by gravity or equivalent action and which are closed and held closed by manually actuated eccentrics.

With the above and other objects in view that will hereinafter appear, the nature of the invention will be more fully understood by following the detailed description, the appended claims, and the several views illustrated in the accompanying drawings.

In the drawings:

Figure 1a is an enlarged detail fragmentary longitudinal section illustrating the coniform flaring head in flaring engagement with the end of the tube.

Figure 2 is a left end elevation, the clamp jaws being shown separated in dotted lines.

Figure 3 is a detail vertical cross section taken on the line 3—3 on Figure 1.

Figure 4 is a fragmentary vertical cross section taken on the line 4—4 on Figure 1.

Figure 5 is a fragmentary longitudinal section illustrating a modified form of expander chuck.

Figure 1:
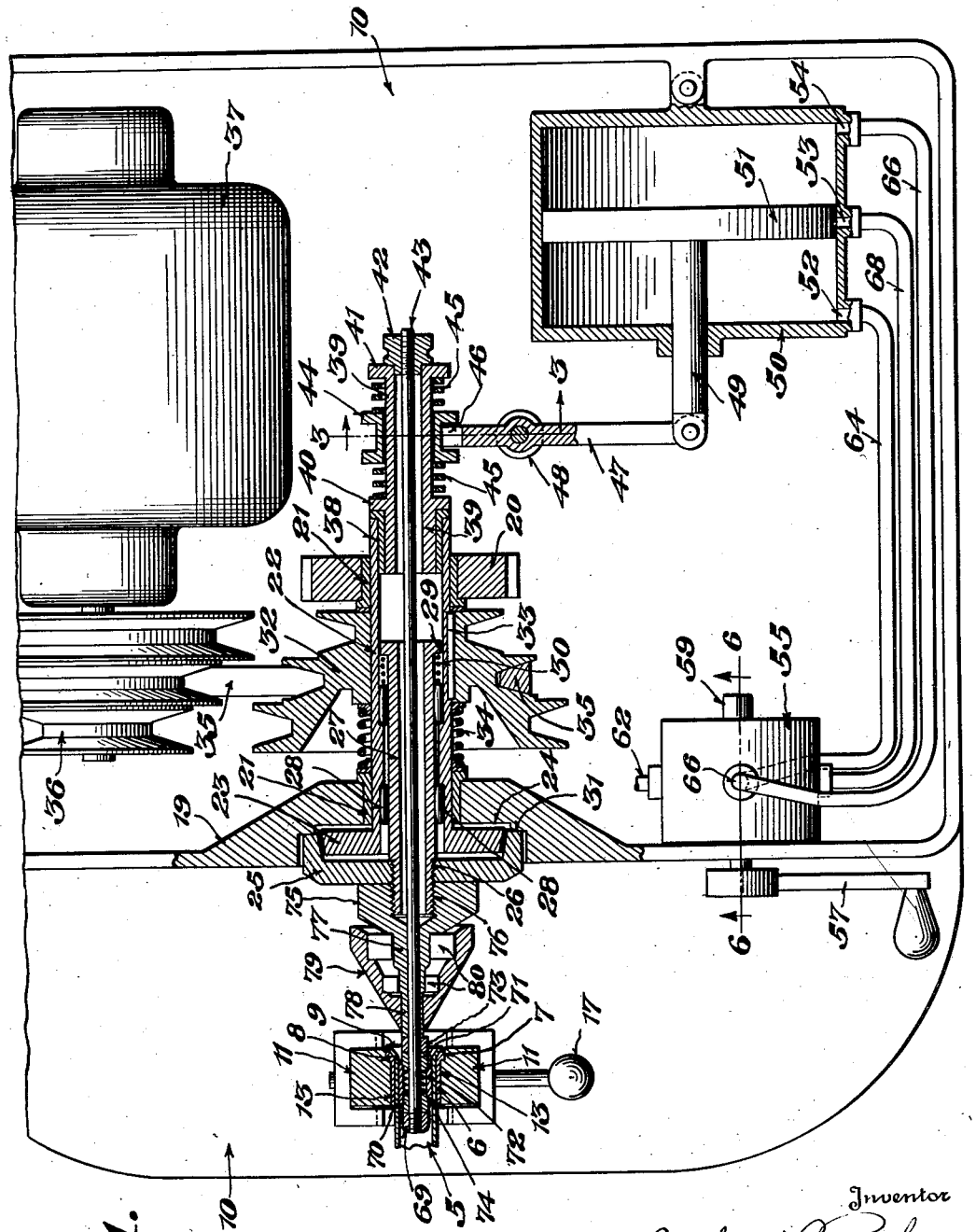
Figure 1 is a horizontal sectional view taken through the axis of the rotary flaring means and the tube expanding chuck, the parts being in the normal non-expanding, non-flaring position.

In the drawings, there is illustrated in Figure 1 a loosely assembled tube and sleeve unit. Such units are disclosed in detail in the co-pending application for U. S. Letters Patent hereinbefore referred to, said application also illustrating one of the completed couplings in which said unit is clamped. This unit includes a tube 5 and a surrounding sleeve 6 having an enlarged head 7 equipped with the usual end flare 8 into which the end extremity of the tube is to be flared as at 9.

The machine herein disclosed as an example of embodiment of the invention comprises a base 10 upon which two clamping jaws 11 are mounted in opposed relation, being pivotally supported, as at 12, on said base. The weight of the jaws is so distributed that they tend to open by gravity in the manner indicated in dotted lines in Figure 2, and these jaws are equipped with opposed, half cylindrical recesses 13 within which the tube and sleeve assembly is securely clamped during the expansion of the tube and the ultimate flaring of the end thereof.

The jaws are pivotally supported in a bearing 14 in which a cross shaft 15 is rockably mounted in end bearings 16, and the shaft is extended at one end and is equipped with a manually operable handle portion 17. The shaft 15 has an eccentric affixed to each end thereof, and each eccentric engages under one of the jaws in the manner illustrated in Figure 2. When the handle 17 is moved to the horizontal position, the eccentrics 18 will be caused to recede from their jaw clamping engagement and permit the jaws to open in the manner indicated in dotted lines in Figure 2, and when the handle is shifted to the vertical position illustrated in full lines in Figure 2, the eccentrics will cause the jaws to close upon the tube and sleeve unit and securely hold it in clamped relation in the manner illustrated in Figure 1.

The base 10 supports a bearing hub 19 and a bearing standard 20, each having a bearing 21 for rotatably and slidably supporting a sleeve 22.

A coniform clutch head 23 is secured upon one end of the sleeve 22 within a recess 24 formed in the hub 19. This clutch head is engageable in a female clutch head 25 which is rotatably secured, as at 26, upon a sleeve 27 having rotative bearing, as at 28, within the sleeve 22. This sleeve 27 is equipped with an abutment flange 29 at the end thereof remote from the clutch element 25, and a compression spring equipment 30 is interposed between the abutment flange and the adjacent bearing set 28 and is effective to normally hold the clutch element 25 against the hub seat 31 in the manner illustrated in Figure 1 of the drawings.

A stepped pulley 32 is keyed upon the sleeve 22, as at 33, and a compression spring equipment 34 is interposed between the hub 19 and the pulley 32 and serves to yieldably hold the pulley 32 against the bearing 21 and the male clutch element 23 out of driving engagement with the female clutch element 25.

The pulley 32 is driven by a belt 35 from a stepped pulley 36 secured upon the shaft of a driving motor 37 supported upon the base 10.

A bearing 38 is carried by the end of the sleeve 22 which is remote from the clutch equipment, and in this bearing a sleeve 39 is slidably mounted. The sleeve 39 is equipped with longitudinally spaced abutment shoulders 40 and 41. The shoulder 40 normally abuts the end of the sleeve 22 and bearing 38 in the manner illustrated in Figure 1, and the shoulder 41 normally engages an end abutment nut 42 secured upon the end of a clutch rod 43. A sleeve shifter ring 44 surrounds the sleeve 39 intermediately of the abutment shoulders 40 and 41 thereof, and a compression spring 45 is interposed between said ring and each of these abutment shoulders in the manner illustrated in Figure 1.

A shifter fork 46 engages the ring 44 and comprises an end extension of a shifter lever 47 which is pivoted intermediate its end, as at 48, upon a fixed support projecting from the base. The end of the lever remote from the fork extension 46 is connected with a plunger 49 projecting from one end of the fluid pressure cylinder 50 and attached to the piston 51 which is reciprocable in the cylinder.

It will be obvious that when the piston 51 is moved to the left, as viewed in Figure 1, it will cause the ring 44 to move to the right, carrying with it the sleeve 39, the abutment nut 42, and the longitudinal rod 43 which extends forwardly through the clutch elements and serves a purpose later to be described. Whenever the piston is moved to the right it will serve to shift the sleeves 39 and 22 to the left, causing the male clutch element 23 to engage in driving relation with the female clutch element 25, and the whole sleeve assembly 39, 22 and 27 will be shifted to the left for a purpose that will later become apparent.

Figure 6:
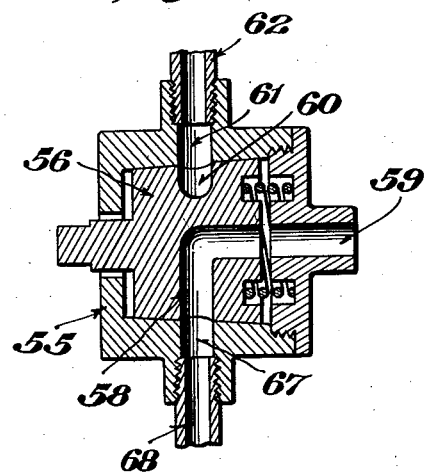
Figure 6 is a longitudinal sectional view of the fluid pressure control valve taken on the line 6—6 on Figure 1.
Figure 7:
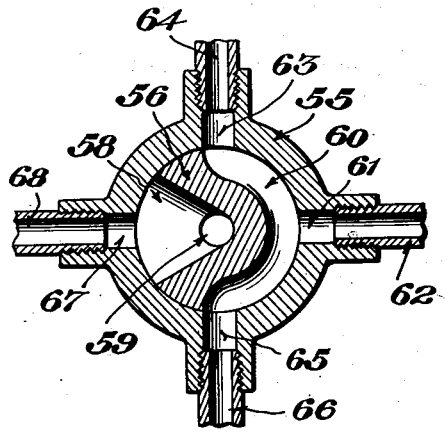
Figure 7 is a transverse section through the control ports of the valve, the valve rotor being positioned for holding the piston in the central position illustrated in Figure 1.
Figure 8:
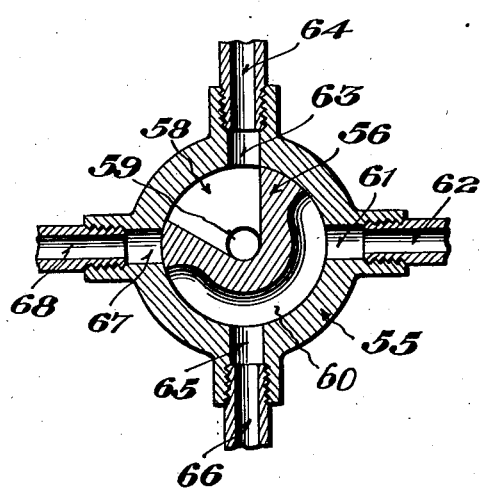
Figure 8 is a view similar to Figure 7, the valve rotor being shown positioned for directing fluid pressure in a manner for moving the piston to the left, as viewed in Figure 1.
Figure 9:
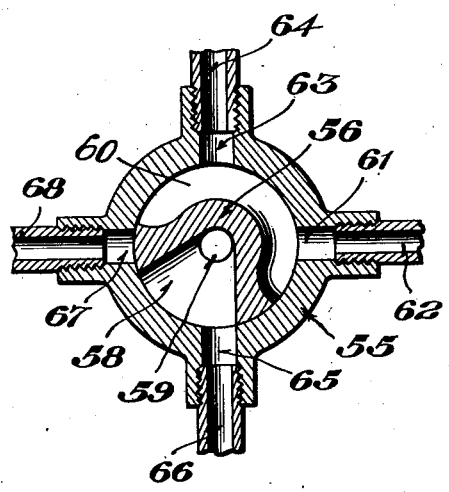
Figure 9 is a view similar to Figure 7, the valve rotor being shown positioned for directing fluid pressure in a manner for moving the piston to the right, as viewed in Figure 1.

The cylinder is equipped with an end port 52, a central port 53, and another end port 54, as illustrated in Figure 1. A control valve 55 is provided for controlling the flow of pressure fluid to and from the cylinder 50, and this valve includes a casing in which a control plug 56 is rotatably mounted. The plug is rotated by manipulation of a hand crank 57 secured to the extended stem of the plug. See Figures 1 and 6.

The valve plug or rotor 56 is equipped with an exhaust clearance 58 which opens centrally through a central exhaust port 59, and is also equipped with a peripheral recess 60 for controlling proper communication with the various pressure and exhaust ports. The valve casing includes a fluid pressure port 61 which is connected by a conduit 62 with any suitable source of fluid pressure (not shown), a port 63 connected by a conduit 64 with the cylinder ports 62, a port 65 connected by a conduit 66 with the cylinder port 64, and a port 67 connected by a conduit 68 with the centrally disposed cylinder port 63. See Figurges 1, 7, 8 and 9.

The end of the rod 43 which extends through and beyond the clutch elements 23, 25 carries a fixed abutment head 69 abutted by a coniform collar 70. Another coniform collar 71 is mounted on the rod 43 in spaced relation with the collar 70, and these collars are yieldably held apart by a compression spring 72 surrounding the rod and interposed between them in the manner illustrated in Figures 1 and 1a. The collar 71 is abutted by a thrust sleeve 73. The coniform collars 70 and 71 engage in the end of a split expander sleeve 74.

A sleeve head 75 is threadably mounted, as at 76, on the end of the sleeve 27 and includes a forwardly extending, reduced diameter, eccentric step portion 77, and an additionally extended, smaller diameter eccentric step portion 78, the latter terminating in abutting relation with the thrust sleeve 73. A coniform flaring head 79 is rotatably mounted on bearings 80 engaging the stepped portions 77 and 78 in the manner clearly illustrated in Figure 1.

In operation, a tube assembly comprising a tube 5 and a tube 6 is slipped over the expander or clutch sleeve 75, as illustrated in Figure 1, after which the clamp jaws 11 are moved from the separated position illustrated in dotted lines in Figure 2 to the effective, tube element clamping position illustrated in full lines in Figures 1 and 2. The handle 57 is next manipulated to cause the cylinder piston 51 to move to the left and effect a shifting of the expander rod 43 to the right. It will be remembered that the sleeve 27 and the sleeve head 75, 77, 78 are held against movement toward the right by engagement of the female clutch element 25 with the hub seat 31. Thus the movement of the rod 43 to the right causes the coniform collars 70 and 71 to move relatively toward each other thereby expanding the split sleeve 74 and causing the tube 5 to be expanded into intimate, wall-to-wall contact with the protective sleeve 6.

The handle 57 is then adjusted to bring about a shifting of the cylinder piston 51 to the right thereby causing the whole sleeve assembly 39, 22, 27, the sleeve head 75, 77 and 78, and also the flaring head 79 mounted thereon, to be shifted to the left. As previously described, this longitudinal shifting of the sleeve assembly connects the clutch elements 23 and 25 in driving relation and the head 75, 77, 78 is in rotary motion as it is moved into engagement with the end extremity of the tube 5. The rotating coniform flaring head 79 will engage in the end of the tube and will flare the same in the manner clearly illustrated in Figures 1 and 1a of the drawings. Because of the eccentric positioning of the coniform flaring head 79 on the eccentric shank extensions 77 and 78 of the sleeve head 75, a very efficient flaring of the tube end is effected.

It is to be understood that during the flaring of the tube end, the expander sleeve 74 is relaxed or contracted. This is true because while the elements 73 and 71 are moved to the left with the expander head, no expansion of the sleeve 74 is effected since movement of the collar 70 and the abutment head 69 is unresisted.

In Figure 5 of the drawings, there is illustrated a slightly modified form of expander chuck equipment. In this form of the invention the longitudinally shiftable rod, designated 81, is equipped with a fixed end abutment 82 and spaced abutment collars 83 between which is interposed a rubber sleeve 84. It will be obvious that as the rod 81 is moved to the right and the collars are moved toward each other, the sleeve 84 will be expanded and serve the same function as the split sleeve 74 hereinbefore referred to.

It is of course to be understood that the details of structure and arrangement of parts may be variously changed and modified without departing from the spirit and scope of my invention.

I claim:

1. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, a sleeve structure surrounding the rod and having a coniform flaring head thereon, and power operated means operable in one direction to move the rod in the equipment expanding direction to cause the tube to be expanded into the sleeve and operable in the opposite direction for moving the sleeve structure and the flaring head longitudinally to cause the flaring head to engage in and flare the tube.

2. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, a sleeve structure surrounding the rod and having a coniform flaring head thereof, power operated means operable in one direction to move the rod in the equipment expanding direction to cause the tube to be expanded into the sleeve and operable in the opposite direction for moving the sleeve structure and the flaring head longitudinally to cause the flaring head to engage in and flare the tube, said sleeve structure including a shank portion eccentrically disposed with relation to the tube axis and upon which said flaring head is mounted, and means for imparting rotation to said sleeve structure.

3. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, a sleeve structure surrounding the rod and having a coniform flaring head thereon, power operated means operable in one direction to move the rod in the equipment expanding direction to cause the tube to be expanded into the sleeve and operable in the opposite direction for moving the sleeve structure and the flaring head longitudinally to cause the flaring head to engage in and flare the tube, said sleeve structure including telescopically related sleeve portions carrying clutch elements engageable for causing said sleeve portions to rotate in unison, means for holding the clutch elements apart except when the sleeve structure is being moved toward the tube, and means for imparting rotation to one of the sleeve portions.

4. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, a sleeve structure surrounding the rod and having a coniform flaring head thereon, power operated means operable in one direction to move the rod in the equipment expanding direction to cause the tube to be expanded into the sleeve and operable in the opposite direction for moving the sleeve structure and the flaring head lonigtuinally to cause the flaring head to engage in and flare the tube, said sleeve structure including telescopitically related sleeve portions carrying clutch elements engageable for causing said sleeve portions to rotate in unison, means for holding the clutch elements apart except when the sleeve structure is being moved toward the tube, and also effective for holding the sleeve portion which carries the flaring head stationary while the rod is being moved in said one direction to oppose and aid expansion of said expanding equipment, and means for imparting rotation to the other of said sleeve portions.

5. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, a sleeve structure surrounding the rod and having a coniform flaring head thereon, power operated means operable in one direction to move the rod in the equipment expanding direction to cause the tube to be expanded into the sleeve and operable in the opposite direction for moving the sleeve structure and the flaring head longitudinally to cause the flaring head to engage in and flare the tube, said sleeve structure including telescopically related sleeve portions carrying clutch elements engageable for causing said sleeve portions to rotate in unison, means for holding the clutch elements apart except when the sleeve structure is being moved toward the tube, and also effective for holding the sleeve portion which carries the flaring head stationary while the rod is being moved in said one direction to oppose and aid expansion of said expanding equipment, said flaring head carrying sleeve portion including a shank eccentrically disposed with relation to the tube axis and upon which shank the flaring head is carried.

6. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, bearing means disposed coaxially with the tube expanding equipment, a sleeve rotatably mounted in said bearing means and having a clutch element at one end and having a second sleeve slidably mounted in its other end and in end abutting relation with said other end, said rod engaging in end abutting relation with said second sleeve for being moved in said one direction thereby, means for imparting rotation to the first mentioned sleeve, a sleeve structure telescopically mounted in and extending from said first mentioned sleeve and carrying a clutch element normally held out of engagement with the first mentioned clutch element and a tube flaring head for engaging in and flaring said tube, and means for moving the second sleeve relative to the first sleeve for moving the rod in said one direction and for moving said second sleeve with said first sleeve and the sleeve structure to cause the clutch elements to effectively engage and the flaring head to engage in and flare said tube.

7. In a machine of the character described, means for holding a tube and a surrounding sleeve, a tube expanding equipment about which the tube and sleeve are held and including a reciprocable rod movable in one direction for expanding said equipment and in the opposite direction for relaxing said expansion, bearing means disposed coaxially with the tube expanding equipment, a sleeve rotatably mounted in said bearing means and having a clutch element at one end and having a second sleeve slidably mounted in its other end and in end abutting relation with said other end, said rod engaging in end abutting relation with said second sleeve for being moved in said one direction thereby, means for imparting rotation to the first mentioned sleeve, a sleeve structure telescopically mounted in and extending from said first mentioned sleeve and carrying a clutch element normally held out of engagement with the first mentioned clutch element and a tube flaring head for engaging in and flaring said tube, and means for moving the second sleeve relative to the first sleeve for moving the rod in said one direction and for moving said second sleeve with said first sleeve and the sleeve structure to cause the clutch elements to effectively engage and the flaring head to engage in and flare said tube, said sleeve structure including a shank portion closely surrounding the rod in eccentric relation to the axis thereof, and said flaring head being coniform in shape and mounted on said shank portion.

8. In a machine of the character described, means for holding a tube and a surrounding sleeve, a tube expanding means about which the tube and sleeve are held, a coniform flaring element, and manually controlled motor operated means movable in one direction for first actuating the expanding means for expanding the tube into tight contact in the sleeve and in the opposite direction for releasing the expanding means and for thereafter forcing the flaring element longitudinally to engage in and flare the end of said tube.

9. In a machine of the character described, means for holding a tube and a surrounding sleeve, a tube expanding means about which the tube and sleeve are held, a single coniform flaring element, said flaring element being placed for having its small end enter said tube and having its axis disposed slightly to one side of and parallel the axis of said tube thereby to place said flaring element eccentrically with relation to the tube held by said holding means, means for rotating said flaring element, and manually controlled fluid motor operated means for actuating the expanding means for expanding the tube into tight contact in the sleeve and for forcing the flaring element to engage in and flare the end of said tube.

10. In a machine of the character described, means for holding a tube and a surrounding sleeve, a tube expanding means about which the tube and sleeve are held, a reciprocable head, a single coniform flaring element, said flaring element being placed for having its small end enter said tube and being freely rotatably supported on said head with its axis disposed slightly to one side of and parallel the axis of said tube thereby to place said flaring element eccentrically with relation to the tube held by said holding means, means for rotating said flaring element, and manually controlled fluid motor operated means for actuating the expanding means for expanding the tube into tight contact in the sleeve and for imparting movement to the head for forcing the flaring element to engage in and flare the end of said tube.

11. In a tube flaring machine, means for holding a tube and a surrounding sleeve, a reciprocable head, a coniform flaring element movable with said head into engagement in the end of a tube held by said holding means, a tube expanding means about which the tube and sleeve are held, and power operated means including an actuator member movable in two directions, means connecting said actuator member with said expanding means and effective when the actuator member is moved in one direction to actuate the expanding means to expand the tube into the sleeve, and means connecting said actuator member with said head and effective when the actuator member is moved in the opposite direction to move said head and cause the flaring element to engage in and flare the tube.

12. In a tube flaring machine, means for holding a tube and a surrounding sleeve, a reciprocable head, a coniform flaring element movable with said head into engagement in the end of a tube clamped by said clamping means, a tube expanding means about which the tube and sleeve are held, said flaring element having its axis disposed eccentrically with relation to the clamped tube, means for rotating the head and the flaring element, and power operated means including an actuator member movable in two directions, means connecting said actuator member with said expanding means and effective when the actuator member is moved in one direction to actuate the expanding means to expand the tube into the sleeve, and means connecting said actuator member with said head and effective when the actuator member is moved in the opposite direction to move said head and cause the flaring element to engage in and flare the tube.

13. In a tube flaring machine, means for holding a tube and a surrounding sleeve, a reciprocable head, a coniform flaring element freely rotatably supported on said head about an axis disposed eccentrically with relation to the axis of a tube held by said holding means and movable with said head into engagement in the end of said tube, a tube expanding means about which the tube and sleeve are held, means for rotating said head, and power operated means including an actuator member movable in two directions, means connecting said actuator member with said expanding means and effective when the actuator member is moved in one direction to actuate the expanding means to expand the tube into the sleeve, and means connecting said actuator member with said head and effective when the actuator member is moved in the opposite direction to move said head and cause the flaring element to engage in and flare the tube.

ARTHUR L. PARKER.